Aug. 22, 1961  O. E. SAARI  2,996,847
GEAR FINISHING APPARATUS
Filed Sept. 5, 1956  3 Sheets-Sheet 2
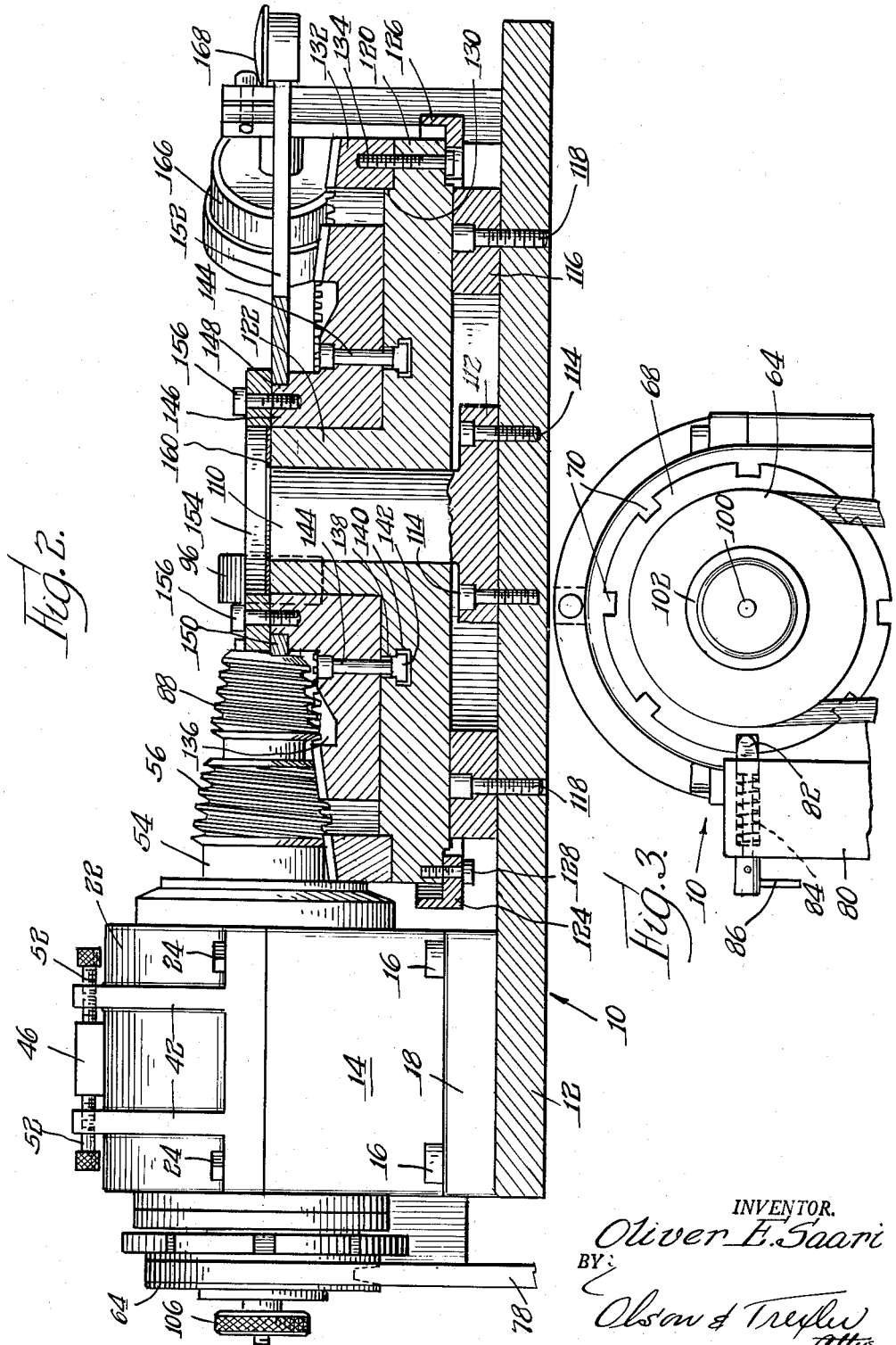
INVENTOR.
Oliver E. Saari
BY
Olson & Trexler
Attys

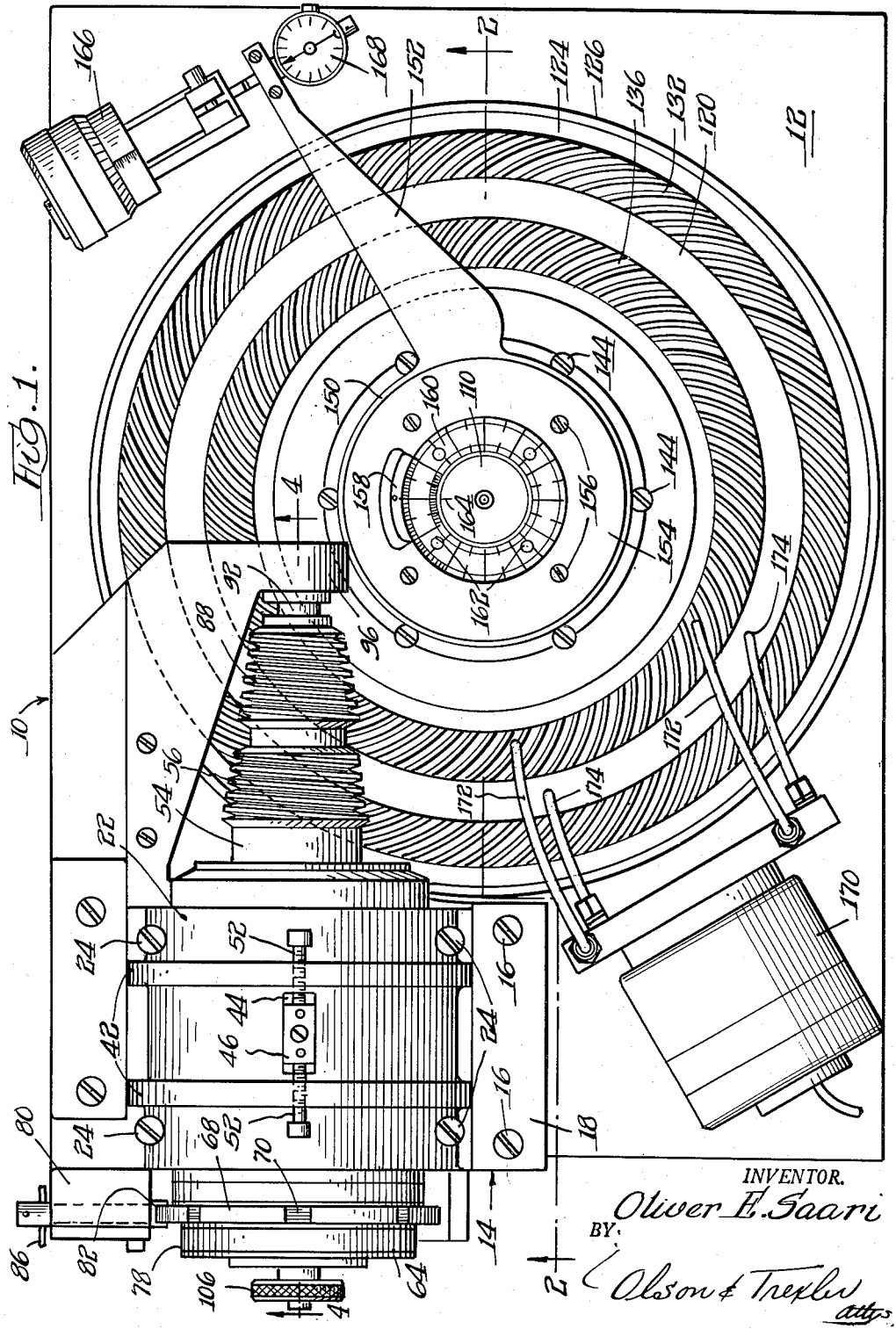

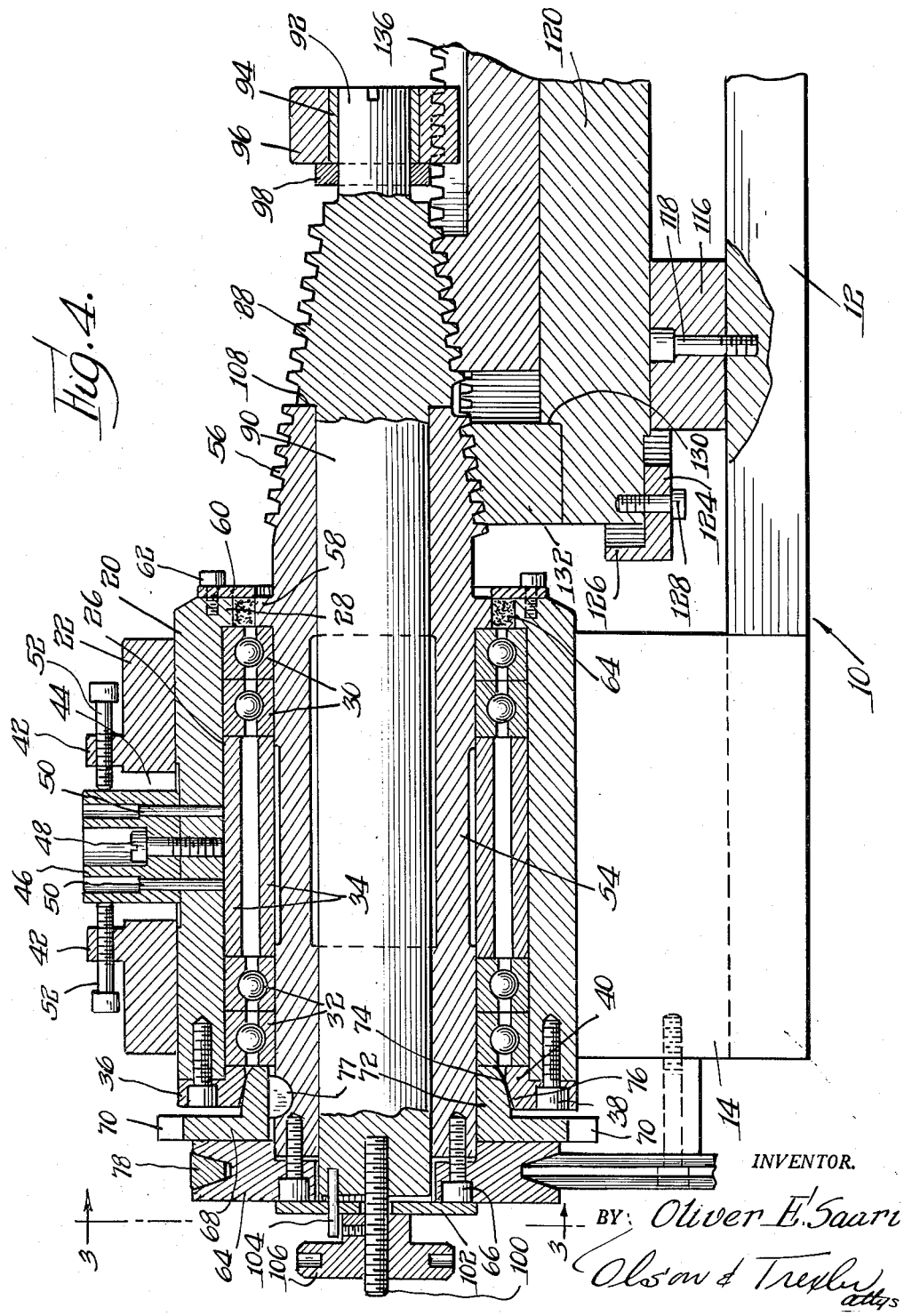

United States Patent Office 2,996,847
Patented Aug. 22, 1961

2,996,847
GEAR FINISHING APPARATUS
Oliver E. Saari, Schiller Park, Ill., assignor to Illinois Tool Works, Chicago, Ill., a corporation of Illinois
Filed Sept. 5, 1956, Ser. No. 608,068
6 Claims. (Cl. 51—26)

This invention is concerned with a machine or apparatus for and method of lapping or finishing gears, and also for measuring errors therein.

More particularly, this invention is concerned with a device or apparatus comprising a master gear set comprising a worm and a gear meshing therewith, and a work gear set comprising a work worm and a work gear, respectively mounted co-axially with the master worm and master gear. The work gear set and master gear set have the same ratio in numbers of teeth and operate on axes that are non-parallel and non-intersecting. In short, the gears are skew axis gears, preferably of the type disclosed and claimed in Oliver E. Saari Patent No. 2,696,-125, issued December 7, 1954, for "Speed Reduction Gearing."

It is an object of this invention to provide an apparatus for lapping or finishing a set of gears.

More specifically, it is an object of this invention to provide an apparatus for and method of lapping or finishing a pair of gears in rotating, but non-driving engagement with one another, which pair of gears is to be used as a gear set.

A further object of this invention is to provide an apparatus for lapping or finishing gears, which apparatus is useful also for measuring errors in a gear set.

Other objects and advantages of the present invention will be apparent from the following description when taken in connection with the accompanying drawings wherein:

FIG. 1 is a plan view of an apparatus constructed in accordance with the principles of this invention;

FIG. 2 is a side view of the apparatus and partially in section as taken along the line 2—2 in FIG. 1;

FIG. 3 is an end view of the apparatus as taken substantially along the line 3—3 in FIG. 4; and FIG. 4 is a longitudinal sectional view taken substantially along the line 4—4 in FIG. 1.

The apparatus constructed in accordance with this invention, and as generally indicated at 10, includes a base plate 12 to which a spindle bearing base 14 is secured by means such as screws 16 passing through a pair of outwardly directed flanges 18.

The bearing base 14 is generally yoke shaped, and a spindle sleeve 20 is clamped therein by a bearing cap 22, screws or bolts 24 passing through a part of the bearing cap, and being threaded into the spindle bearing base 14. The spindle sleeve is provided with a cylindrical bore 26, and an inwardly directed lip or flange 28 is provided at the front end (the right end as viewed in the drawings) of the spindle sleeve. Front bearings 30 engage against the flange or lip 28, and rear bearings 32 are spaced therefrom by cylindrical bearing spacers 34. A bearing retaining ring 36 is held against the rear end of the spindle sleeve 20 by means such as screws or bolts 38 extending through the ring and threaded into the spindle sleeve. An axially extending flange 40 on the bearing retaining ring 36 engages the rear bearings 32, and urges these bearings against the bearing spacers 34, and the bearing spacers against the front bearings 30, which therefore are forced against the flange or lip 28. The front and rear bearings 30 and 32 preferably comprise pairs of ball bearings as will be apparent in the drawings.

The bearing cap 22 is provided with arcuate ribs 42 in spaced apart relation. Between the ribs, the bearing cap is provided with a longitudinal slot 44. A sleeve key 46 in the form of a rectangular metal block extends through the slot 44, fitting snugly along the sides thereof, but spaced from the front and rear ends. The sleeve key is held to the spindle sleeve by means such as a bolt 48 and a pair of dowel pins 50. Set screws 52, preferably having knurled heads are threaded through the ribs 42 in opposition to one another, and bear against the opposite ends of the sleeve key 46. The axial position of the spindle sleeve 20 is adjustable by means of these set screws 52 acting on the sleeve key 46.

A hollow shaft 54 is journalled in the bearings 30 and 32, and has a master worm 56 formed on the front end thereof. A radially outwardly extending flange 58 on the hollow shaft 54 is aligned with the inwardly extending flange or lip 28, and serves to position the hollow shaft axially relative to the front bearings 30, and hence relative to the spindle sleeve 20. A flat retainer ring 60 is held by screws or the like 62 against the front end of the spindle sleeve, and retains packing material 64 in the space between the flanges 28 and 58.

At the opposite or rear end of the hollow shaft 54, a pulley 64 is secured to the hollow shaft by means such as bolts 66. An index plate 68 having peripheral notches 70 therein abuts the front face of the pulley, and has an axially extending flange 72 with a tapered outer surface 74 thereon projecting within the bearing retainer ring 36, and engaging a complementary tapered surface 76 of the bearing retainer ring. A key 77 keys the index plate to the hollow shaft 54, and hence to the pulley 64. The flange 72 of the index plate engages the rear bearings 32, and also serves to locate the hollow shaft relative to the spindle sleeve, in conjunction with the flange 58.

During lapping or finishing of the gears, as will be set forth hereinafter, the pulley 64 is driven by a belt 78 from a suitable power source such as an electric motor (not shown). An upstanding arm 80 adjacent the index plate 68 carries a plunger 82 urged by a spring 84 toward the index plate, for fitting in one of the recesses or notches 70 to lock the index plate, and hence the worms. A handle 86 is provided on the plunger or locking pin 82 for retracting the same, and for holding the pin or plunger in retracted position. Preferably means of a type well known in the art (not shown) is provided for holding the pin or plunger retracted.

The work worm 88 (the worm to be finished or lapped) is formed on the end of a worm shaft 90 which extends through the hollow shaft 54. A pilot 92 is formed on the end of the work worm 88, and is journalled in a sleeve bearing 94 in an out bearing support 96 in the form of an arm extending upwardly and laterally from the base plate 12. A packing ring 98 for receiving lubricant encircles the pilot 92 and is positioned adjacent the out bearing support 96 and bearing 94.

A stud 100 extends from the rear end of the worm shaft 90, and a washer 102 fits around this stud and engages the rear surface of the pulley 64, such surface projecting slightly rearwardly of the end of the worm shaft 90. A dowel pin 104 locks the washer 102 to the worm shaft 90 for rotation therewith. A hand wheel 106 is threaded on the stud 100, and when this hand wheel is turned down tight, it clamps the washer 102 securely against the pulley 64 frictionally to lock the washer to the pulley. Furthermore, such tightening of the hand wheel on the stud pulls a shoulder 108 at the rear end of the work worm 88 against the front end of the master worm 56, for forming a frictional engagement at that point tending to lock the worms together. Accordingly, when the hand wheel 106 is tightened on the stud 100, the master worm and work worm are driven as a unit. Relative angular adjustment of the master worm and work worm can be made by loosening the hand wheel 106 on the stud 100 to release the clamping engagement.

A stub shaft or axle 110 is provided with a radially extending flange 112 at its base, and this flange is secured to the base plate 12 by means such as bolts 114 extending through the flange and threaded into the base plate. Accordingly, the stub shaft or axle 110 extends upwardly beyond the ends of the worms 56 and 58, and displaced laterally therefrom. A ring 116 of slightly greater thickness than the flange 112 is mounted on the base plate 12 by means such as bolts 118 extending through the ring and threaded into the base plate. The ring is mounted concentrically with the stub shaft or axle 110, and the heads of the screws or bolts 118 are countersunk so as to extend no further than the top of the ring.

A disc 120 having a central, upstanding hollow shaft or sleeve 122 is mounted for rotation about the stub shaft or axle 110 and resting on the ring 116. A ring 124 having an upstanding peripheral flange 126 of cylindrical shape is secured beneath the disc 120 at the periphery thereof by means such as screws or bolts 128 extending through the ring and threaded into the disc 120. The ring 124 and flange 126 serve to collect lubricant and abrasive material as will be apparent hereinafter.

The disc is provided on its upper face with a shoulder 130 spaced inwardly from the circumference of the disc, and a ring gear 132 seats against this shoulder, being held in place by means such as screws or bolts 134 extending up through the disc 120 and threaded into the gear. The gear 132 comprises a worm gear or face gear meshing with the master worm 56, and hereinafter will be referred to as the master gear.

The work gear 136 meshing with the work worm 88 is provided with a central aperture, and is mounted on top of the disc 120 about the upstanding hollow shaft or sleeve 122 thereof. The upper face of the disc 120 is formed with a circular groove 138 communicating with an undercut circular recess or passageway 140. Inverted, T-shaped nuts 142 are received in the recess 140, and bolts 144 extend through the gear 136 and through the groove 138, and are threaded into the nuts 142. When the bolts 144 are received rather loosely in the nuts, the work gear 136 can be rotated relative to the master gear 132. However, when the nuts 142 are drawn up tightly by the bolts 144, the work gear is clamped tightly against the plate 120, and the work gear and master gear then cannot be rotated relative to one another.

The work gear 136 is provided with an upstanding, central hub portion 146 surrounding the hollow shaft or sleeve 122, and terminating on a level therewith. The hub 146 is provided adjacent its upper edge with a shoulder 148, and a ring 150 is received on this shoulder. The ring is provided with a generally radially extending arm 152. A clamping ring 154 is received on top of the hub 146, and when tightened thereon by bolts 156 extending through the clamping ring and threaded into the hub, the clamping ring clamps the ring 150, and hence the arm 152, rigidly to the hub 146 for angular movement with the work gear 136. The ring 154 is provided with an index 158 (FIG. 1) and an index plate 160 is secured to the top of the hollow shaft or sleeve 122 by means such as screws 162. Indicia formed on the top of the stub shaft or axle 110 as indicated at 164 cooperate with the index plate 160.

A micrometer 166 of well known design is mounted on the base 12, and cooperates with a dial indicator 168 mounted on the arm 152 in order to indicate angular movement of the arm, and hence of the work gear.

A motor and pump unit 170 is supported from the base plate 12 adjacent the periphery of the master gear 132, and suitable conduits 172 lead to the work gear 136 to deposit lubricating oil and abrasive thereon, while return conduits 174 extend into the space or sump between the work gear 136 and master gear 132.

The lapping operation

As is well known, backlash in mating gears is to be expected to some extent. Backlash, as is well known, is a measure of the angle through which one of a pair of mating gears may rotate without imparting motion to the other. In the present instance, with the two worms fixed together, and the two worm gears fixed together, there is a composite backlash. As used hereinafter, composite backlash is a measure of the angle through which the gear assembly or connected worm gears may rotate with no rotation of the worms. The composite backlash can be no greater than the value of backlash for either the work gear and worm, or the master gear and worm, which ever is the lesser. The worms can be relatively rotated, as will be appreciated, by loosening the hand wheel 106, and by relatively rotating the pulley wheel at the index plate. By such relative rotational adjustment of the worms, composite backlash can be controlled to any value between the maximum noted above, and zero. The relative rotational adjustment of the worms can employ either set of opposing tooth profiles, depending upon the direction in which the work worm is displaced relative to the master worm. The relative rotational position at which the work gear and master gear are secured also is adjustable, as will be appreciated.

To distinguish the opposing profiles on a gear set, the terms "low side" and "high side" will be used hereinafter. Viewed from the top, with the worms above the gears, as in FIG. 1, clockwise rotation is imparted to the gears by contact on the low side of the teeth. Power through the high side rotates the gears counterclockwise.

Assume the high side of the work gear set is to be corrected. By the use of axial and rotational adjustment of the worms, composite backlash between the high side of the work and the low side of the master gear set is adjusted to a value suitable for abrasive action at that position of gear rotation where, due to errors, the composite backlash is a minimum.

When the assembly, so adjusted, is driven by tooth contact on the master gear, the high side of the work gears will remain out of contact, the clearance between work worm and work gear varying from point to point depending upon the errors existing on the high side of the work gears and the low side of the master gears. The addition of suitable abrasive material to the work gears, as through the conduits 172, will remove material from the tooth surfaces. More material will be removed at the points of less clearance than at the points of greater clearance. By this process, the variation in backlash at different points is reduced, bringing errors in the work gears to equal, for all practical purposes, those in the master gears. If master gears virtually without errors are used, then work gears of similar precision will be finished.

By strategic shifting of the work gear relative to the master gear, precision can be obtained in the work gear which is greater than that in the master gear. Alignment of errors in the work gear with errors in the master gear of opposite phase can remove all of the work gear errors, as the reversal of the direction of an error must take it through zero magnitude.

In the type of skew axis worm gearing disclosed and claimed in my aforesaid patent, the worm has a constant lead and can be adjusted axially to bring the worm and gear into closer engagement.

Measuring

In accordance with the present invention, it is possible to check, measure, or inspect gears while they are being lapped, without removing them from their operational mounting.

During normal lapping or finishing of the work gear set, the arm 152 is left free, by having the screws or bolts 156 loose so that the ring 154 is not clamped against the arm ring 150. When it is desired to make a measurement or inspection, the screws 156 are tightened so that the arm 152 is rigidly clamped to the work gear. For a given angle of worm rotation, as determined by the index plate 68, a given linear movement of the tip of the arm 152 as measured by the micrometer 166 and indicator 168, can be calculated. Measured deviation from the calculated value represents error in tooth profiles.

For inspecting an angular accuracy of output rotation in increments of rotation greater than the range of the linear measuring device, specifically the micrometer 166 and the indicator 168, the work and master gears and worms are positioned to create measurable composite backlash between one side of the teeth on the work gear set and the other side of the teeth on the master gear set. Variation in backlash at various positions on the gears is a function of the errors in index in both gear sets.

Rechecks with the master and work gears in different relative positions would yield a change in the pattern of variation in composite backlash with respect to both gears, if both are contributing to the variation. Analysis of the nature of this variation determines the error in each gear. Errors in the opposite sides of the teeth are determined by similar analysis of composite backlash variation using those sides of the teeth.

It now will be apparent that I have disclosed improved apparatus and methods for finishing or lapping a gear set, and of aparatus and methods for measuring errors in the gears without the necessity of removing the gears from the lapping apparatus.

Various changes from the illustrative examples shown and described herein would no doubt occur to those skilled in the art, and are to be understood as forming a part of this invention insofar as they fall within the spirit and scope of the appended claims.

The invention is claimed as follows:

1. Apparatus for finishing gears comprising a support, a spindle carried by said support, a hollow shaft rotatably journalled in said spindle, a spiral worm on said hollow shaft, a shaft within said hollow shaft, a spiral worm on said last mentioned shaft and co-axial with the first mentioned shaft, one of said spiral worms being a master worm and the other being a work worm, means for axially shifting said spindle for shifting said spiral worms axially as a unit, means for securing said shafts and worms together for rotation as a unit, a master face type worm gear, means rotatably mounting said master gear in mesh with said master worm, a face type work worm gear, means rotatably mounting said work gear co-axially with said master gear and substantially meshing with said work worm, means for securing said gears together for rotation as a unit, and means for rotating said worms as a unit.

2. Apparatus for finishing gears as set forth in claim 1 wherein the means for axially shifting the spindle comprises a lateral projection on said spindle extending through an opening in said support, and opposed means on said support engaging said projection and bearing thereagainst for movement thereof.

3. Apparatus for finishing gears comprising a support, a hollow shaft rotatably mounted in said support, a spiral worm on the end of said hollow shaft, an inner shaft within said hollow shaft and co-axial therewith, a spiral worm on the end of said co-axial shaft and projecting beyond the first mentioned spiral worm and being co-axial therewith, the second mentioned spiral worm having a shoulder engageable with the end of the first mentioned spiral worm, one of said spiral worms being a work worm and the other being a master worm, means at the other end of said shafts for relative pulling on the inner shaft and pushing on the hollow shaft to force said shoulder against the first mentioned worm for frictionally securing the worms substantially directly together in contiguous relation as a unit, a master face type worm gear, means rotatably mounting said master worm gear in mesh with said master worm, a work face type worm gear means rotatably mounting said work worm gear co-axially with said master work gear in mesh with said work worm, means for securing said worm gears together as a unit, and means for rotating said worms.

4. Apparatus as set forth in claim 3 wherein the pulling means comprises a rotary drive member fixed on the end of said hollow shaft opposite the worm thereon, said rotary drive member extending axially beyond the corresponding end of the inner shaft, a plate extending transversely across the last mentioned end of the inner shaft and engaging the rotary drive member, means fixing the plate to the inner shaft for rotation therewith, and means for urging said plate axially toward said inner shaft and against said rotary drive member.

5. Apparatus as set forth in claim 4 wherein the means fixing the plate to the inner shaft comprises an axially directed eccentrically disposed elongated member extending into both said plate and said inner worm shaft, and the means for urging said plate axially toward said inner shaft comprises a threaded stud engaging said inner shaft and extending through said plate and having means thereon abutting said plate.

6. Apparatus for finishing gears comprising a master worm element and a master gear element, means rotatably mounting said master worm element, means rotatably mounting said master gear element in mesh with said master worm element, means mounting a work worm element coaxially with said master worm element, means for clamping said worm elements axially together to secure said worm elements together for rotation as a unit, means mounting a work gear element coaxially with said master gear element and substantially meshing with said work worm element, means for clamping said gear elements axially together to secure said gear elements together for rotation as a unit, drive means, means fixing said drive means to said worm elements for rotating said worm elements as a unit, and means including means for loosening one of said clamping means for adjusting the relative angular positions of the elements of at least one of said units.

References Cited in the file of this patent
UNITED STATES PATENTS

| | | |
|---|---|---|
| 1,017,613 | Weaver | Feb. 13, 1912 |
| 1,032,974 | Weaver | July 16, 1912 |
| 1,198,637 | Kingsbury | Sept. 19, 1916 |
| 1,708,570 | Hanson | Apr. 9, 1929 |
| 1,822,846 | Wildhaber | Sept. 8, 1931 |
| 2,433,510 | Falk | Dec. 30, 1947 |
| 2,445,649 | Turner et al. | July 20, 1948 |